United States Patent [19]
Burckhardt

[11] 3,980,344
[45] Sept. 14, 1976

[54] APPARATUS FOR CONTROLLING A TWO-CIRCUIT BRAKE INSTALLATION FOR MOTOR VEHICLES

[75] Inventor: Manfred H. Burckhardt, Waiblingen, Germany

[73] Assignee: Daimler-Benz Aktiengesellschaft, Germany

[22] Filed: Mar. 10, 1975

[21] Appl. No.: 556,915

[30] Foreign Application Priority Data
Mar. 8, 1974 Germany............................ 2411096

[52] U.S. Cl. ............................ 303/6 C; 188/181 C; 188/349; 303/20; 303/21 AF; 303/21 F; 303/61
[51] Int. Cl.² ........................ B60T 8/06; B60T 8/26
[58] Field of Search .......... 303/21 F, 21 AF, 61–63, 303/68–69, 10, 20, 6 C, 21 EB, 21 BE; 188/181 A, 349, 181 C

[56] References Cited
UNITED STATES PATENTS

| | | | |
|---|---|---|---|
| 3,574,415 | 4/1971 | Stamm | 303/20 |
| 3,582,152 | 6/1971 | Burckhardt et al. | 303/21 EB |
| 3,687,242 | 8/1972 | Green | 188/181 C |
| 3,708,214 | 1/1973 | Riordan et al. | 303/21 F |
| 3,781,063 | 12/1973 | Valpreda | 303/6 C |
| 3,827,761 | 8/1974 | Ihada | 303/21 F X |
| 3,836,209 | 9/1974 | Neisch | 303/21 F |
| 3,861,757 | 1/1975 | Jackson et al. | 303/21 F X |

FOREIGN PATENTS OR APPLICATIONS

| | | | |
|---|---|---|---|
| 2,017,026 | 5/1970 | France | 303/21 F |
| 2,128,668 | 12/1972 | Germany | 303/21 F |

Primary Examiner—Duane A. Reger
Assistant Examiner—Douglas C. Butler
Attorney, Agent, or Firm—Craig & Antonelli

[57] ABSTRACT

Apparatus for controlling a two-circuit brake system for motor vehicles with the aid of a controllable pressure reducing valve which reduces the pressure in the rear wheel brake circuit compared to that in the front wheel brake circuit and which includes a by-pass line between the pressure inlet from the master cylinder and the pressure connection to the rear wheel brakes which is controllable by a solenoid valve; the brake slippage at the front and at the rear wheels is thereby measured, the thus-obtained values are compared with each other, and the solenoid valve is then controlled by a pulse sequence as long as the brake slippage at the front wheels is larger by a predetermined value than that at the rear wheels.

5 Claims, 6 Drawing Figures

APPARATUS FOR CONTROLLING A TWO-CIRCUIT BRAKE INSTALLATION FOR MOTOR VEHICLES

The present invention relates to a method for controlling a two-circuit brake system for motor vehicles with the air of a controllable pressure-reducing valve which reduces the pressure in the rear wheel brake circuit compared to that in the front wheel brake circuit and which includes a by-pass line between the pressure feed from the master cylinder and the pressure connection to the rear wheel brakes controllable by means of a solenoid valve. The present invention further relates to an installation for carrying out such a method.

The correct control of the brake pressure at the rear axle in dependence on the load condition of the vehicle is a task which is difficult to solve. One has attempted to solve this problem by so-called brake force distributors having a shifting point variable as a function of the load. However, negative effects occur thereby which decisively deteriorate the driving condition of the vehicle. More particularly, if one controls the position of the shifting point in dependence, for example, on the inward spring deflection of a rear wheel, then a completely different driving behavior results depending on whether one brakes in a right-hand curve or in a left-hand curve. Since such driving conditions occur increasingly more frequently with the increasing traffic density, the described solution has to be rejected for safety reasons.

A pressure-reducing valve has already been proposed in the prior German Offenlegungsschrift 2,128,668 (filed June 9, 1971) which corresponds to the aforementioned type. This valve is so constructed that upon energization of the solenoid valve, the pressure coming from the master cylinder is permitted to pass through in full, i.e., unreduced, to the brake cylinders of the rear wheels. If, in contradistinction thereto, the solenoid valve is not energized, then the pressure at the rear wheel brakes is reduced in the valve corresponding to the area ratio prevailing at the valve piston. In this prior art pressure-reducing valve, the solenoid valve is controlled by the pressure medium reserve or supply in the front wheel brake circuit, i.e., it is opened, when this pressure medium reserve or supply is no longer present or is no longer present in full. In that case, not the reduced pressure but rather the full brake pressure then reaches the rear wheels.

The braking stability is of decisive significance for the practical fitness and satisfactory operation of a vehicle. This can be achieved by a so-called fixed setting or adjustment. Unfortunately, such a fixed setting leads in vehicles with a high load to an increase of the brake path compared to the optimum case which is technically possible. For such a fixed setting, one appropriately dimensions the wheel-brake saddles or calipers in such a manner that with an energized solenoid valve—i.e., with the same pressure in the front wheel and rear wheel brakes—the optimum fixed setting valid for the permissive overall weight is achieved. The pressure reduction in the described valve with a non-energized solenoid valve is now so constructed that on the basis of the wheel-brake saddles or calipers dimensioned in the manner described hereinabove, the brake force distribution correct for the non-loaded vehicle is realized. This solution is correct for the two indicated extreme conditions. The present invention is now concerned with the task to assure an optimum braking behavior also within the range disposed therebetween.

As solution to the underlying problem, a method is proposed by the present invention according to which the brake slippage at the front and at the rear wheels is measured, both values are compared with each other, and the solenoid valve is energized by a pulse sequence as long as the brake slippage at the front wheels is larger by a predetermined value of, for example, about 5% to about 15% than at the rear wheels. It is thereby additionally proposed as particularly appropriate if the pulse-pause-ratio of the pulse sequence, i.e., the ratio of the duration of the pulse to the duration of the pause or interruption, can be varied. One possesses in this manner the possibility to additionally interfere also in the method in a controlling manner in that, for example, in case of a sharp braking the aforementioned pulse-pause-ratio is a different one than with a weak braking, for example, in that the pulses are longer and the pauses are shorter.

Furthermore, an installation for carrying out the method described hereinabove is additionally proposed by the present invention which is characterized by a front wheel sensor and a rear wheel sensor which are both connected with the inputs of an electronic comparator whose output is operatively connected with the solenoid valve by way of a pulse control unit of conventional type.

Accordingly, it is an object of the present invention to provide a method and apparatus for controlling a two-circuit brake installation for motor vehicles which avoids by simple means the aforementioned shortcomings and drawbacks encountered in the prior art.

Another object of the present invention resides in a method and apparatus for controlling a two-circuit brake system for motor vehicles in which the correct control of the brake pressure at the rear axle in dependence on the load condition of the vehicle is achieved by relatively simple means.

A further object of the present invention resides in a method and apparatus for controlling a two-circuit brake system for motor vehicles in which the driving behavior remains substantially unaffected regardless of the prevailing driving condition of the vehicle when the brake is actuated.

Still a further object of the present invention resides in a method and apparatus for controlling a two-circuit brake system for motor vehicles which greatly increases the safety of the vehicle and optimizes the braking capability of the system under all operating conditions.

These and further objects, features and advantages of the present invention will become more apparent from the following description when taken in connection with the accompanying drawing which shows, for purposes of illustration only, one embodiment in accordance with the present invention, and wherein.

Figure 1:
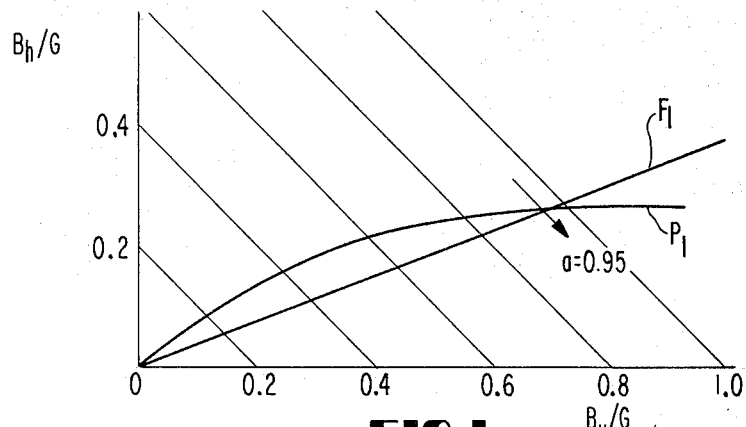
FIGS. 1 and 2 are brake force distribution diagrams with a so-called fixed setting, the ratio of brake force at the rear wheels $B_h$ to the vehicle weight G being plotted against the brake force at the front wheels $B_v$ to the vehicle weight G.
Figure 2:
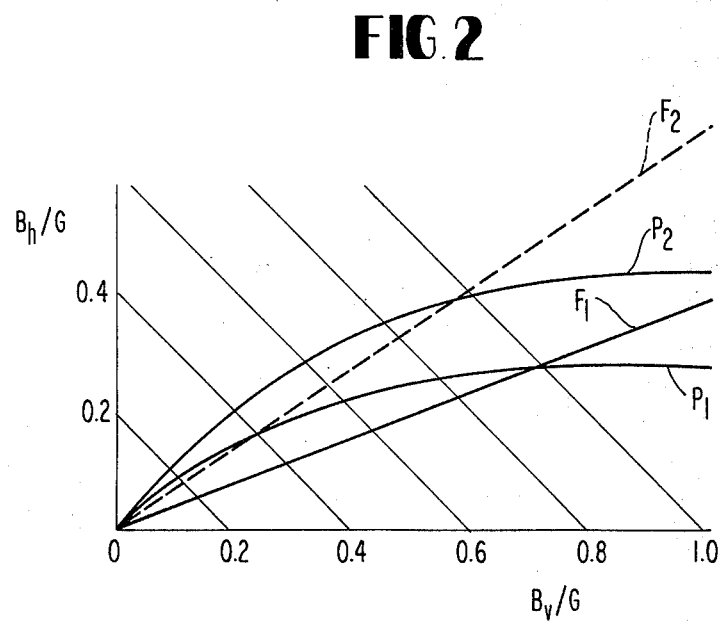

Referring now to the drawing wherein like reference numerals are used throughout the various views to designate like parts, a so-called fixed setting or adjustment for an unloaded vehicle is illustrated in FIG. 1. The straight line $F_1$ thereby repesents the installed brake force distribution which is fixedly predetermined by the construction of the valve, whereas the curve $P_1$ represents the parabola of the ideal brake force distribution with an unloaded vehicle. In FIG. 2, these two lines are further completed by the corresponding lines $F_1$, $F_2$ for the installed brake force distribution with permitted overall weight and $P_2$ the parabola of the ideal brake force distribution also with the permitted overall weight. These two line pairs represent the two extreme cases, so to speak of.

The point of departure is now the requirement for a maximum stability. This exists according to the newest recognitions of the driving dynamics when the brake slippage at the front wheels is larger by a predetermined amount, appropriately approximately between 5% and about 10% than the brake slippage at the rear wheels. At the beginning of the braking action, the pressure reducing valve is interconnected in every possible load condition, i.e., the solenoid valve is not energized. Upon actuation of the brake, the brake pressure and the brake force corresponding to the installed brake force distribution builds up correspondingly at the front and at the rear axle with a complete pressure reduction. This takes place according to FIG. 3 until in point A, the installed or preset brake force distribution intersects with the straight line of the respectively prevailing frictional connection coefficient at the front wheels. At this point the front wheels would normally lock.

Figure 3:
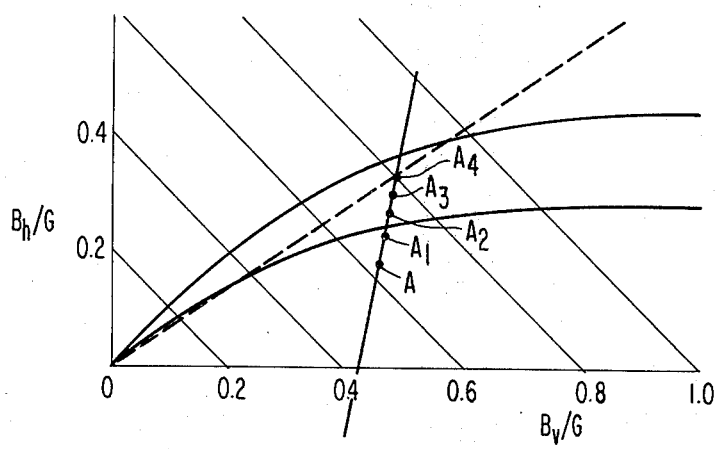
FIG. 3 is a diagram similar to FIG. 2 with a pulse sequence according to the present invention indicated therein.
Figure 4:
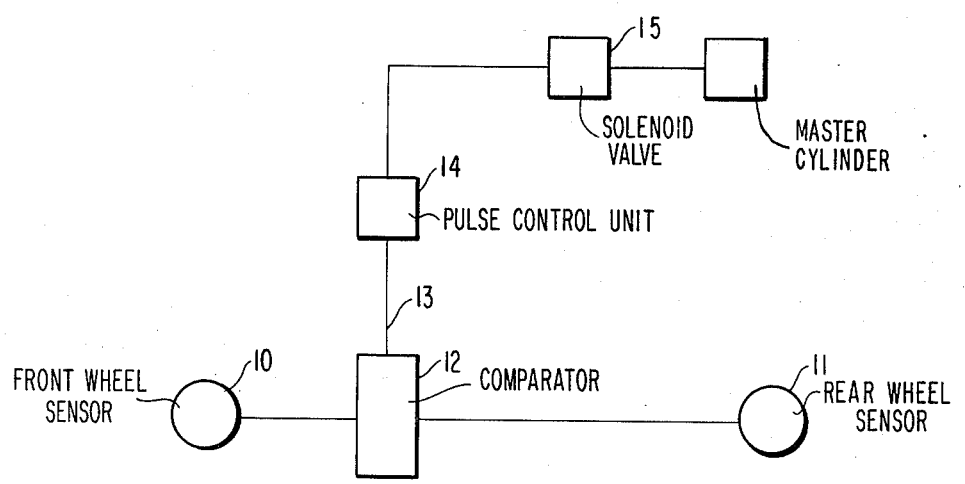
FIG. 4 is a schematic block diagram of an installation in accordance with the present invention.

However, according to the present invention, a front wheel sensor 10 and a rear wheel sensor 11 are now provided as illustrated in FIG. 4 which determine the brake slippage. These two measured values are fed to an electronic comparator 12 of conventional construction which is adjusted to the already mentioned predetermined value of, for example, about 5% to about 10%. If this value is exceeded, i.e., a stronger brake slippage occurs at the front wheels, then a signal appears at the output 13 of the comparator 12 which is fed to a pulse control unit 14 of conventional type. The solenoid valve 15 is then energized for a short period of time by the pulse control unit 14 so that the pressure in the rear axle brake circuit is raised up to the point $A_1$ in FIG. 3. After a delay of a few milliseconds, the slippage condition is again tested and reviewed. If it still lies above the indicated limit, then the solenoid valve is once again energized for a short period of time in the manner already described (order of magnitude of some milliseconds). The brake point is now displaced to point $A_2$ (FIG. 3). This interplay continues for such length of time until the difference slippage is reduced which in the indicated example is the case when reaching the point $A_4$. In this manner, the pressure build-up is automatically stopped closely below the respectively applicable parabola of the ideal brake force distribution.

Figure 5:
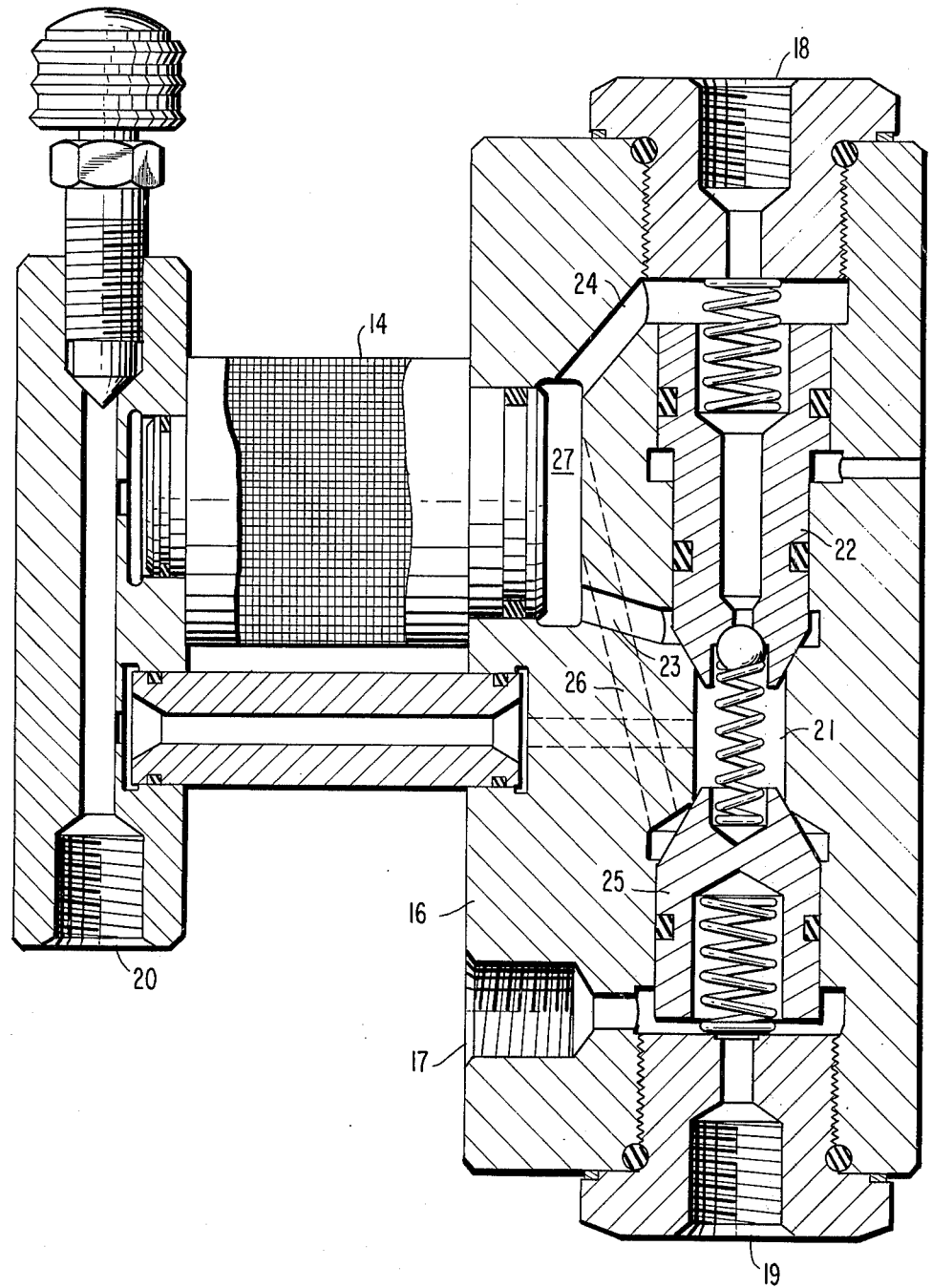
FIG. 5 is a cross-sectional view through a pressure-reducing valve in accordance with the present invention.

According to FIG. 5, the pressure reducing valve 16 includes a connection 17 for the front wheel brakes and a connection 18 for the rear wheel brakes. The pressure is supplied from the front wheel brake circuit at 19 and for the rear wheel brake circuit at 20. The pressure enters from the last-mentioned connection 20 into the control space 21 and the control piston 22 which is offset or stepped in the customary manner, permits to the pressure to pass over, reduced by the corresponding amount, into the connection 18 by way of channels 23 and 24. The piston 25 is acted upon by the pressure in the front wheel brake circuit. If this pressure collapses for any reason, then the piston 25 is forced back in the downward direction as viewed in FIG. 5 by the pressure in the space 21 and thereby opens up the line 26, through which the full pressure then can reach the connection 18.

The solenoid valve 14 controls a bypass line which leads directly from the connection 20 to the space 27, from which starts the line 24. The solenoid valve 14 is normally closed. If it is opened in the described manner then a pressure shock of short duration directly reaches the space 27 from the master cylinder of the rear axle brake circuit in bypassing the pressure reduction and from there reaches the connection 18 at the rear wheel brakes by way of the channel 24. This pressure build-up can take place always when the solenoid valve 14 is opened for a short period of time whereby it always involves only a very few milliseconds.

Figure 6:
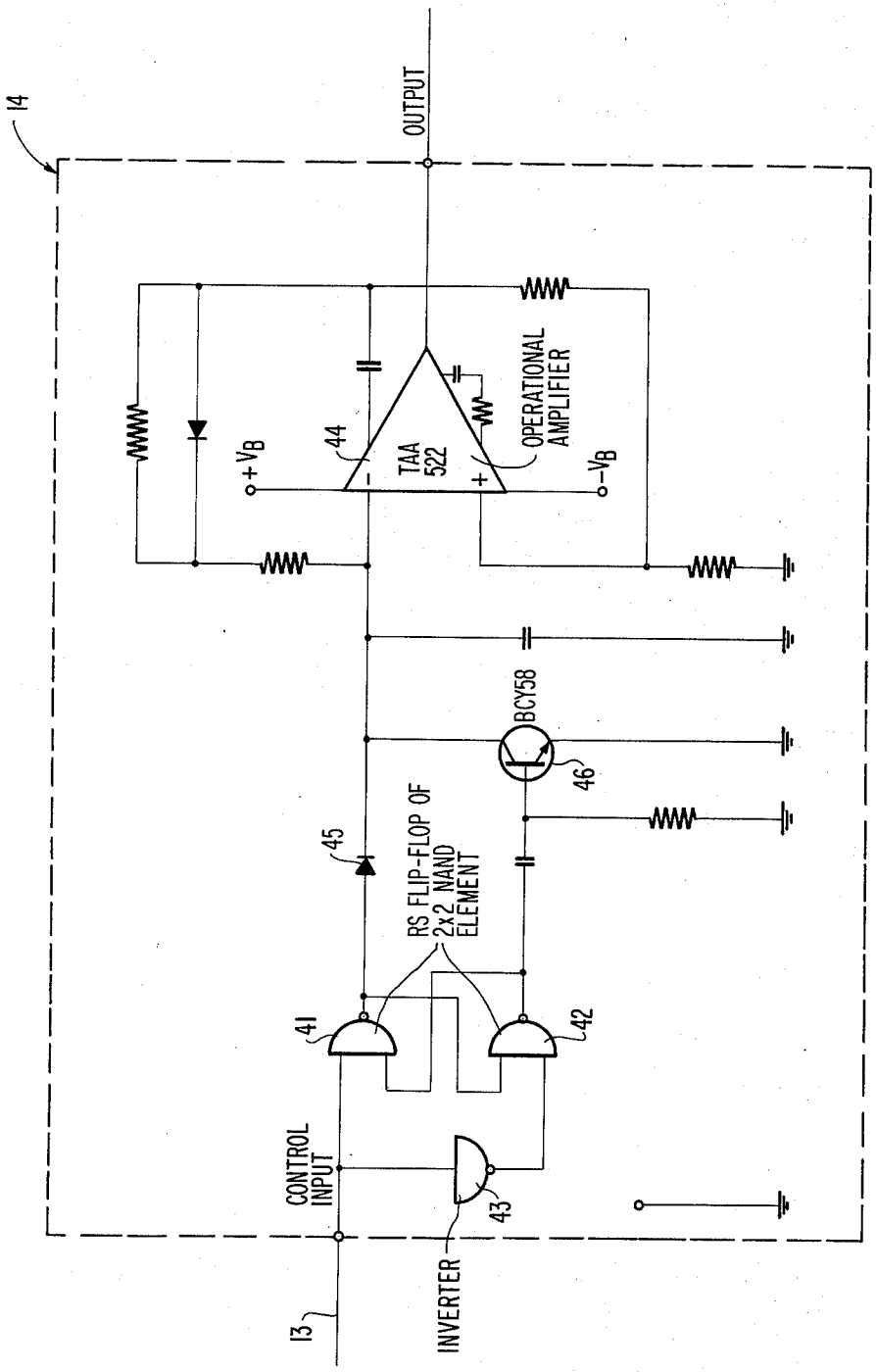
FIG. 6 is a schematic diagram of a typical pulse control unit.

Since the various electronic components, shown in block diagram in FIG. 4, are of conventional type, and involve commercially available elements, a detailed description thereof is dispensed with herein for the sake of simplicity. For example, the signal appearing at line 13 may be fed directly to one input of NAND element 41 (FIG. 6) while the same control signal is fed to one input of another NAND element 42 by way of an inverter 43. The other inputs of each NAND circuit are cross coupled with the outputs of the respective other NAND circuit thereby forming effectively flip-flop circuits. The outputs of the NAND element 41 is also connected with the input of an operational amplifier 44 of conventional type by way of a rectifier 45 while the output of the other NAND element 42 is also connected with the same input of the operational amplifier 44 by way of a transistor 46 which includes in its base circuit a differentiating network so that the output of the operational amplifier produces the desired pulses to energize the solenoid valve 15 connected to the output thereof as described hereinabove.

However, other conventional pulse control circuits may be used for the pulse control unit 14 shown in FIG. 6, again utilizing conventional circuit elements and circuit connections.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An apparatus for controlling the two-circuit brake system for a motor vehicle with the aid of a controllable pressure-reducing valve means operable to reduce the pressure in the rear wheel brake circuit compared to that in the front wheel brake circuit, said pressure-reducing valve means including a bypass line means providing a bypass between a pressure inlet operatively connected with a master cylinder and a pressure connection leading to the rear wheel brakes, and a solenoid valve means for controlling said bypass line means, characterized by means for measuring the brake slippage at the front wheels and at the rear wheels and producing electrical signals corresponding to the measured values, comparing means for comparing with each other the measured values, and pulse control means operatively connected at its input with the comparing means and its output with the solenoid valve means and operable to energize the solenoid valve means as long as the brake slippage at the front wheels is larger by a predetermined value than that of the rear wheels.

2. An apparatus according to claim 1, characterized in that said value is about 5% to about 15%.

3. An apparatus according to claim 1, characterized in that said pulse control means controls the solenoid valve by a predetermined pulse sequence to energize the solenoid valve means for a predetermined short duration.

4. An apparatus according to claim 3, characterized in that said value is about 5% to about 15%.

5. An apparatus according to claim 3, characterized by means for varying the pulse-pause ratio of the pulse sequence produced by the pulse control means in dependence on the actuation of the brake.

\* \* \* \* \*